United States Patent
Dewan

(10) Patent No.: US 7,043,008 B1
(45) Date of Patent: May 9, 2006

(54) SELECTIVE CONVERSATION RECORDING USING SPEECH HEURISTICS

(75) Inventor: Rohit Dewan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 549 days.

(21) Appl. No.: 10/028,383

(22) Filed: Dec. 20, 2001

(51) Int. Cl.
*H04M 3/00* (2006.01)

(52) U.S. Cl. ............... 379/265.06; 379/265.07; 379/266.01; 379/266.02; 379/266.03; 379/309

(58) Field of Classification Search ............ 379/265.06, 379/265.07, 266.01, 266.02, 266.03, 309
See application file for complete search history.

(56) References Cited

U.S. PATENT DOCUMENTS

| | | | |
|---|---|---|---|
| 5,170,426 A | 12/1992 | D'Alessio et al. ............ 379/38 |
| 5,854,825 A * | 12/1998 | Mukaihara et al. ......... 379/309 |
| 6,263,049 B1 * | 7/2001 | Kuhn ...................... 379/32.01 |
| 6,363,145 B1 * | 3/2002 | Shaffer et al. ......... 379/265.02 |
| 6,542,602 B1 * | 4/2003 | Elazar ................... 379/265.06 |
| 6,600,821 B1 | 7/2003 | Chan et al. ............ 379/265.07 |

\* cited by examiner

*Primary Examiner*—Ahmad F. Matar
*Assistant Examiner*—Quynh H. Nguyen
(74) *Attorney, Agent, or Firm*—Baker Botts L.L.P.

(57) ABSTRACT

A system and method for selectively monitoring, recording, storing, and handling telephone conversations through the use of speech analysis is disclosed. In particular, the present invention utilizes a speech analyzer to analyze a speech signal during a telephone conversation between two parties, and a recording and storage device to record and store the telephone conversation. Based on variations in signal characteristics related to the emotional state of the caller, the system selectively generates a trigger to keep the stored recording of the telephone conversation. The present invention also selectively determines whether to send a notification in response to said trigger.

32 Claims, 1 Drawing Sheet

SELECTIVE CONVERSATION RECORDING USING SPEECH HEURISTICS

TECHNICAL FIELD OF THE INVENTION

The present invention relates to the selective handling and recording of telephone conversations. More particularly, the present invention relates to utilizing speech analysis methods for selectively handling and recording telephone conversations.

BACKGROUND OF THE INVENTION

Many corporate telephone call centers record the telephone conversations between their telephone operators and customers. Typically the recordings are made either for training purposes, used as examples to be reviewed later by new operators, or for quality assurance purposes, so that the performance of the telephone operators can be monitored and evaluated.

Today call centers may record telephone calls in one of two ways: (1) by either randomly recording conversations, or (2) by recording all conversations. When telephone interactions are screened randomly, a strong possibility exists that important conversations will not be recorded. In the case where all calls are recorded, a tremendous amount of resources can go to waste, since the vast majority of call center conversations are likely to be uneventful. Moreover, call center systems that are currently in place provide no means for alerting a supervisor in real-time if a problem situation arises other than by the call center agent. Instead, supervisors must rely on a subsequent review of the recording. Often times, from a customer service perspective, it is too late to rectify the situation.

SUMMARY OF THE INVENTION

The present invention relates to a system and method for selectively monitoring, recording, storing, and handling telephone conversations through the use of speech analysis. The system and method of the present invention records and saves only those conversations that exhibit certain problem signs, providing the technical advantage of saving storage space over conventional systems and methods. Further, later review of calls recorded in accordance with the present invention is less cumbersome since every stored call would likely be a problem call. This is another technical advantage of the present invention. Additionally, the present invention provides real-time alerts, e.g. to a supervisor, such that a call falling within certain pre-defined parameters can be monitored so that a decision can be made as to how to best handle the telephone call. This provides the technical advantage that call center supervisors have greater control over their call operators and a higher level of service to customers, in a more efficient manner than conventional systems and methods.

In accordance with an exemplary embodiment of the present invention a monitoring and recording device is provided which monitors and records telephone conversations between the call center operators and the outside customers. A speech analyzer is used to monitor the communication between an operator and a customer during a telephone conversation, while a recording and storage device records the conversation. Based on variations in frequency and amplitude of the voice signals, the speech analyzer can identify changes in emotion of the parties. Once a change in emotion is detected which matches a predefined trigger event, the monitoring and recording device marks the recording of the call and can automatically alert the call operator's supervisor or supervisor's station.

BRIEF DESCRIPTION OF THE DRAWINGS

For a complete understanding of the present invention and the advantages thereof, reference is now made to the following description taken in conjunction with the accompanying drawings in which like reference numbers indicate like features, components and method steps, and wherein.

DETAILED DESCRIPTION OF THE INVENTION

Figure 1:
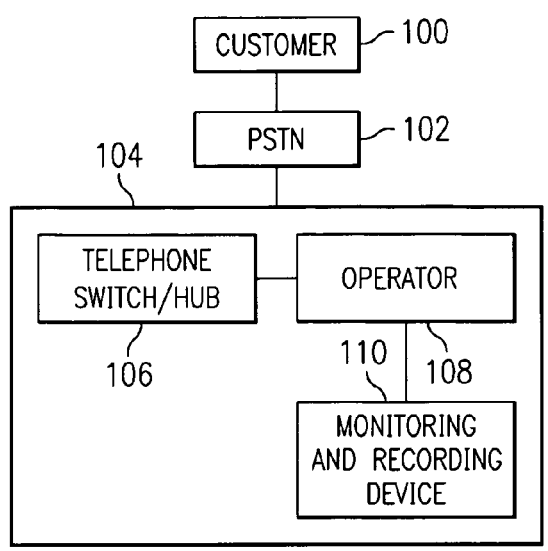
FIG. 1 is an illustration of an exemplary embodiment of the present invention and its placement within a typical call center.

Now referring to the drawings, FIG. 1 illustrates the conventional connection established between a customer 100 and a call center 104 during a telephone call and an exemplary placement of the present invention within a call center 104. The customer 100 is connected to a call center 104 through the public telephone network 102. The public telephone network 102 is commonly known to those skilled in the art. The call center 104 may include a telephone switch or hub 106, one or more operators 108, and one or more monitoring and recording devices 110.

Figure 2:
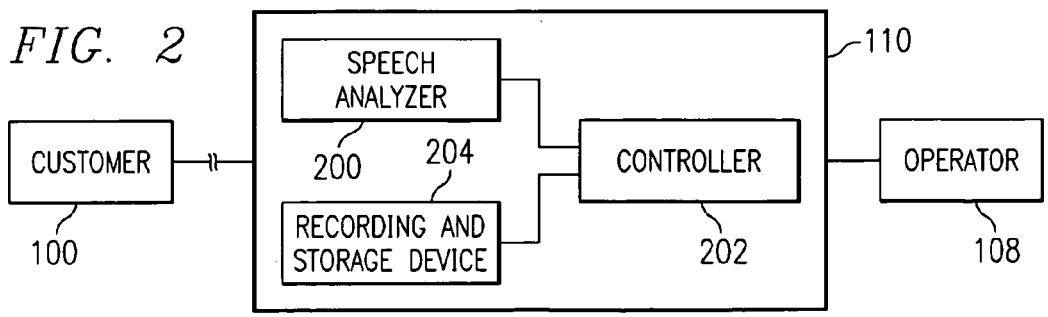
FIG. 2 is an illustration of an exemplary embodiment of the present invention.

FIG. 2 illustrates one exemplary embodiment of the present invention. The monitoring and recording device 110 is connected such that it can monitor the speech signals from both a customer 100 and an operator 108 when they are connected in a telephone conversation. The monitoring and recording device 110 also includes a speech analyzer 200, controller circuit 202 and a recording and storage device 204. The controller circuit 202 can be a general purpose computer, a microcontroller, ASIC, FPGA, EEPROM, ROM, RAM, any combination thereof, or any other circuit which can be used to control the other components of monitoring and recording device 104. Alternatively, the functional aspects of the controller circuit 202 may be integrated into either the speech analyzer 200 or the recording and storage device 304 for simplicity of design. The recording and storage device 204 can include any means for recording and storing audio data, including but not limited to tape, computer-readable memory, hard disk, and magnetic-optical drive.

In operation, a telephone call is first connected between the operator 108 and the customer 100. The call may be initiated by either the operator 108 or the customer 100. Using conventional methods, the telephone switch 106 is used to route a customer call to one or more operators 108 within the call center 104.

Figure 3:
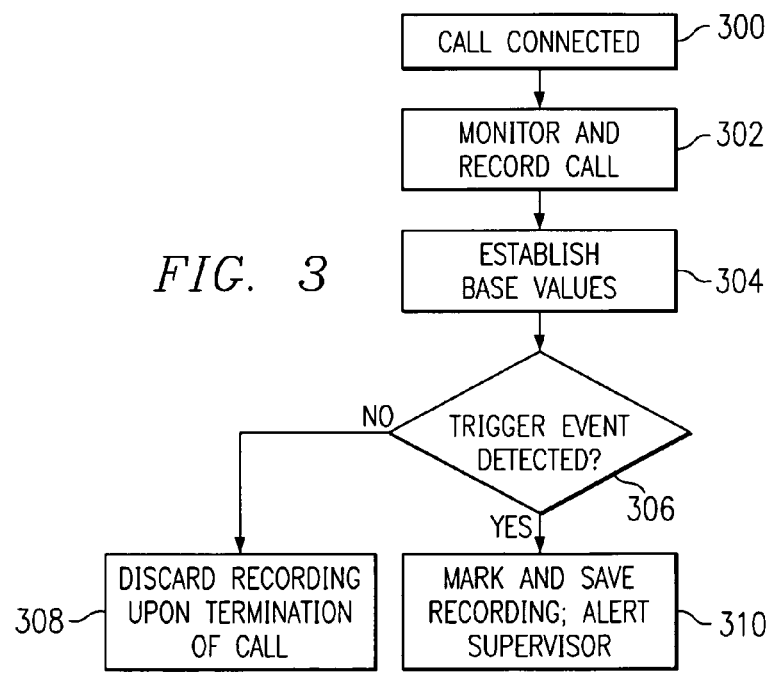
FIG. 3 is a flow chart illustrating the operation of an exemplary system in accordance with the present invention.

FIG. 3 is a flowchart illustrating the operation of an exemplary embodiment of the present invention. Once the telephone call is connected at block 300, the speech analyzer 200 detects the signal on the line and prompts the recording and storage device 204 to begin recording the conversation at block 302. This prompt can either be sent directly by the speech analyzer 200 to the recording and storage device 204, or indirectly, by the prompting controller circuit 202 which then would send a command to the recording and storage device 204, i.e., the controller circuit 202 knows that line is connected and prompts the speech analyzer 200 to begin analyzing and tells the recording and storage device 204 to start recording. At block 304, during an initial period thereafter, the controller circuit 202 and the speech analyzer 200 work in conjunction to establish base values to identify signal characteristics typical for the conversation. Once the base values are established, the system continues to monitor the conversation for deviations in the amplitude and/or frequency values falling outside of a threshold range, defined by the base values plus or minus a calculated or predetermined value. At block 308, the system determines whether a trigger event is detected. If the speech signals never deviate outside of the threshold range, i.e., no triggering event is detected, once the call terminates in a normal fashion, the recording of the conversation may be deleted at block 308 by the recording and storage device 204. If the signals do exceed the threshold range at any point during the conversation, i.e., a triggering event is detected at block 306, the controller circuit 202 at block 310 takes appropriate actions, as described more fully below.

In accordance with an exemplary embodiment of the present invention, once a triggering event is detected, the controller circuit 202 may mark the recording of the conversation and command the recording and storage device 204 to save the call for future review. Additionally, detection of a triggering event may generate an alert to the call center supervisor or supervisor's station. The controller circuit 202 transmits a report of the event and related identification data to the supervisor via computer network or other some other conventional data transmission method. The alert contains information such as the identity and location of the call operator 108 and the type of event detected. Moreover, the supervisor could be given the option to "snoop" the call, which would allow the supervisor to listen to the conversation, or to take over the call altogether, by transferring the call from the operator's telephone to the supervisor's station, e.g., telephone.

Other embodiments may also be employed through modification of the base system of FIG. 2. One alternative is to change the physical placement of the monitoring and recording device 110 within the call center 104. Rather than including one monitoring and recording device 110 at each operator's station 108, one alternative is to utilize one multi-port monitoring and recording device connected at the call center telephone switch 106. This multi-port monitoring and recording device located at the telephone switch 106 has the equivalent functionality of a plurality of monitoring and recording devices 110, and would be capable of monitoring several different lines and recording the data on each at any given time. It would have easy access to all incoming and outgoing communications at the call center 104. This centralized placement may provide benefits in terms of installation and maintenance of the system.

Figure 4:
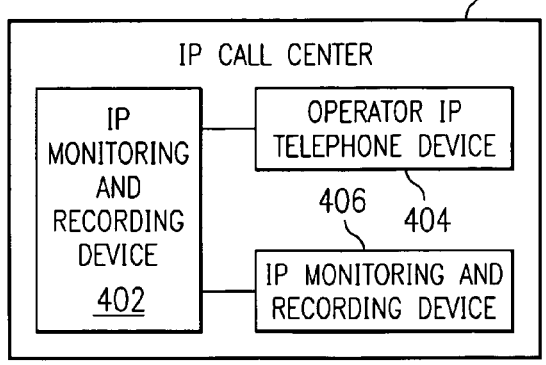
FIG. 4 an illustration of an exemplary embodiment of the present invention and its placement within a call center which utilizes an Internet Protocol-based telephone system.

FIG. 4 shows another exemplary embodiment of the present invention, where a monitoring and recording device 406 is used in an Internet Protocol (IP) telephony environment. The system is structurally similar to the previously described exemplary embodiment of FIG. 2. In the exemplary embodiment of FIG. 4, IP server 402 connects to a plurality of operator IP telephones 404. An operator IP telephone 404 can be a stand-alone IP telephone device, an IP softphone implemented on a general purpose computer, or any other means for IP voice communication. Also connected to the server 402 is an IP monitoring and recording device 406, or plurality thereof. The system operates in a similar manner to the monitoring and recording device 110 of FIG. 2, but there are differences in the implementation. In this system, there is no single point to which the monitoring and recording device 406 can be connected in order to monitor the conversation. Instead, the monitoring and recording device 406 may be attached to the network and assigned its own IP address. Data traffic from calls between an operator and a customer must be routed to the IP monitoring and recording device 406. This can be done in several ways. One way is to force the operator IP telephone device 404 to forward all data, both received from the customer end and transmitted by the operator IP telephone device 404, to the IP monitoring and recording device 406. This would ensure that the IP monitoring and recording device 406 received all relevant data packets and therefore a full voice data stream from each party for monitoring and storage.

In another exemplary embodiment, the IP voice data could be routed to the IP monitoring and recording device 406 using an alternative method. Rather than requiring the operator telephone device 404 to forward the data to the IP monitoring and recording device 406, the system could automatically create a conference call with the IP monitoring and recording device 406 every time an operator connects with an outside customer. The IP address of the IP monitoring and recording device 406 could be included automatically as part of the conference call, thereby ensuring that the IP monitoring and recording device 406 receives the speech data from both parties. Once a system is implemented which routes the data to the IP monitoring and recording device 406, the system would function in much the same way as its analog counterpart described above, the only necessary change being different equipment used to perform the speech analysis and the use of a network protocol, e.g., Transmission Control Protocol/Internet Protocol (TCP/IP).

Although the present invention has been described in detail with reference to specific exemplary embodiments thereof, various modifications, alterations and adaptations may be made by those skilled in the art without departing from the spirit and scope of the invention. It is intended that the invention be limited only by the appended claims.

What is claimed is:

1. A monitoring and recording system, said system comprising:
    a speech analyzer, said speech analyzer monitoring a signal characteristic of a conversation between a first caller and a second caller, the signal characteristic comprising at least one of a signal frequency and a signal amplitude;
    a recording device, said recording device recording said conversation;
    a controller, said controller determining whether a parameter of said conversation exceeds a threshold by:
        during an initial period of said conversation, determining a base value from the monitored signal characteristic, the base value representing a typical value for the monitored signal characteristic for said conversation, the base value defining a threshold range;
        after the initial period of said conversation, establishing whether a subsequent value for the signal characteristic is outside of the threshold range; and
        determining that the parameter of the conversation exceeds the threshold if the subsequent value for the signal characteristic is outside of the threshold range; and a storage device, said storage device storing said conversation during said conversation and retaining said stored conversation after termination of said conversation if said parameter of said conversation exceeds said threshold.

2. The system of claim 1, wherein said speech analyzer analyzes variations in at least one frequency of said conversation.

3. The system of claim 1, wherein said speech analyzer analyzes variations in amplitude of said conversation.

4. The system of claim 1, wherein said recording device comprises one of a hard drive, a tape recorder, random access memory, dynamic random access memory, flash memory, and a magnetic-optical drive.

5. The system of claim 1, wherein said storage device comprises one of a hard drive, a tape recorder, random access memory, dynamic random access memory, flash memory, and a magnetic-optical drive.

6. The system of claim 1 further comprising a telephone switch, said telephone switch routing said conversation to said second caller.

7. The system of claim 1 further comprising a network hub, said network hub routing said conversation to said second caller.

8. A monitoring and recording system for recording and selectively storing speech signals, said system comprising:
　a speech analyzer, said speech analyzer monitoring a signal characteristic of at least one signal between a first caller and a second caller, the signal characteristic comprising at least one of a signal frequency and a signal amplitude;
　a controller operable to determine whether a parameter of the at least one signal exceeds a threshold by:
　　during an initial period of said conversation, determining a base value from the monitored signal characteristic, the base value representing a typical value for the monitored signal characteristic for said conversation, the base value defining a threshold range;
　　after the initial period of said conversation, establishing whether a subsequent value for the signal characteristic is outside of the threshold range; and
　　determining that the parameter of the at least one signal exceeds the threshold if the subsequent value for the signal characteristic is outside of the threshold range; and
　a recording and storage device, said recording and storage device recording and selectively storing said at least one signal in response to the controller determining that the parameter of the at least one signal exceeds a threshold.

9. The system of claim 8 wherein said speech analyzer analyzes variations in at least one frequency of said at least one signal.

10. The system of claim 8 wherein said speech analyzer analyzes variations in amplitude of said at least one signal.

11. The system of claim 8 wherein said recording and storage device comprises one of a hard drive, a tape recorder, random access memory, dynamic random access memory, flash memory, and a magnetic-optical drive.

12. The system of claim 8 wherein said controller triggering said recording and storage device to store said at least one signal in response to said monitoring of said speech analyzer.

13. The system of claim 8 further comprising a telephone switch, said telephone switch routing said at least one signal to said second caller.

14. The system of claim 8 further comprising a network hub, said network hub routing said at least one signal to said second caller.

15. A monitoring and recording system for selectively notifying, said system comprising:
　a speech analyzer, said speech analyzer monitoring a signal characteristic of at least one signal between a first caller and a second caller, the signal characteristic comprising at least one of a signal frequency and a signal amplitude;
　a controller operable to determine whether a parameter of the at least one signal exceeds a threshold by:
　　during an initial period of said conversation, determining a base value from the monitored signal characteristic, the base value representing a typical value for the monitored signal characteristic for said conversation, the base value defining a threshold range;
　　after the initial period of said conversation, establishing whether a subsequent value for the signal characteristic is outside of the threshold range; and
　　determining that the parameter of the at least one signal exceeds the threshold if the subsequent value for the signal characteristic is outside of the threshold range;
　a recording and storage device, the recording and storage device recording and selectively storing the at least one signal in response to the controller determining that the parameter of the at least one signal exceeds a threshold; and
　a notification device, said notification device selectively sending a notification in response to said monitoring of said speech analyzer.

16. The system of claim 15, wherein said speech analyzer analyzes variations in at least one frequency of said at least one signal.

17. The system of claim 15, wherein said speech analyzer analyzes variations in amplitude of said at least one signal.

18. The system of claim 15 further comprising a supervisor station, said supervisor station receiving said notification sent by said notification device.

19. The system of claim 18, wherein said supervisor station comprises one of a general purpose computer and telephone.

20. The system of claim 15, wherein said notification device comprises at least one of a transmitter, general purpose computer, an IP device, and an alarm.

21. A monitoring and recording system for recording and selectively storing speech signals, said system comprising:
　means for monitoring and analyzing a signal characteristic of at least one signal between a first caller and a second caller, the signal characteristic comprising at least one of a signal frequency and a signal amplitude;
　means for determining whether a parameter of the at least one signal exceeds a threshold by:
　　during an initial period of said conversation, determining a base value from the monitored signal characteristic, the base value representing a typical value for the monitored signal characteristic for said conversation, the base value defining a threshold range;
　　after the initial period of said conversation, establishing whether a subsequent value for the signal characteristic is outside of the threshold range; and
　　determining that the parameter of the at least one signal exceeds the threshold if the subsequent value for the signal characteristic is outside of the threshold range; and means for recording and selectively storing said at least one signal in response to determining that the parameter of the at least one signal exceeds a threshold.

22. A method for monitoring and selectively recording a conversation, said method comprising:
receiving a conversation from a first caller;
monitoring a signal characteristic of said conversation between a first caller and a second caller, the signal characteristic comprising at least one of a signal frequency and a signal amplitude;
recording said conversation;
determining whether a parameter of said conversation exceeds a threshold by:
during an initial period of said conversation, determining a base value from the monitored signal characteristic, the base value representing a typical value for the monitored signal characteristic for said conversation, the base value defining a threshold range;
after the initial period of said conversation, establishing whether a subsequent value for the signal characteristic is outside of the threshold range; and
determining that the parameter of the conversation exceeds the threshold if the subsequent value for the signal characteristic is outside of the threshold range; and
storing said conversation during said conversation and retaining said stored conversation after termination of said conversation if said parameter of said conversation exceeds said threshold.

23. The method of claim 22, wherein said determining whether a parameter of said conversation exceeds a threshold comprises analyzing variations in at least one frequency of said conversation.

24. The method of claim 22, wherein said determining whether a parameter of said conversation exceeds a threshold comprises analyzing variations in amplitude of said conversation.

25. A method for monitoring and recording speech signals and selectively storing and notifying in response to said monitoring, said method comprising:
receiving at least one signal;
monitoring a signal characteristic of said at least one signal based upon changes in at least one of frequency and amplitude of said at least one signal, the signal characteristic comprising at least one of a signal frequency and a signal amplitude;
determining whether a parameter of the at least one signal exceeds a threshold by:
during an initial period of said conversation, determining a base value from the monitored signal characteristic, the base value representing a typical value for the monitored signal characteristic for said conversation, the base value defining a threshold range;
after the initial period of said conversation, establishing whether a subsequent value for the signal characteristic is outside of the threshold range; and
determining that the parameter of the at least one signal exceeds the threshold if the subsequent value for the signal characteristic is outside of the threshold range; and
selectively sending a trigger in response to determining that the parameter of the at least one signal exceeds a threshold.

26. The method in claim 25 further comprising selectively storing said recording of said at least one signal in response to said trigger.

27. The method in claim 25 further comprising sending a notification in response to said trigger.

28. The method of claim 25 further comprising receiving said at least one signal for said monitoring routed through a switch.

29. The method of claim 25 further comprising receiving said at least one signal for said monitoring routed through a network hub.

30. The method of claim 25 wherein said monitoring comprises analyzing variations in at least one frequency of said at least one signal.

31. The method of claim 25 wherein said monitoring comprises analyzing variations in amplitude of said at least one signal.

32. Logic encoded in a memory device to monitor and record speech signals and selectively store and notify in response to said monitoring, comprising logic operable to at least:
receive at least one signal;
monitor a signal characteristic of said at least one signal based upon changes in at least one of frequency and amplitude of said at least one signal, the signal characteristic comprising at least one of a signal frequency and a signal amplitude;
determining whether a parameter of the at least one signal exceeds a threshold by:
during an initial period of said conversation, determining a base value from the monitored signal characteristic, the base value representing a typical value for the monitored signal characteristic for said conversation, the base value defining a threshold range;
after the initial period of said conversation, establishing whether a subsequent value for the signal characteristic is outside of the threshold range; and
determining that the parameter of the at least one signal exceeds the threshold if the subsequent value for the signal characteristic is outside of the threshold range; and
selectively send a trigger in response to determining that the parameter of the at least one signal exceeds a threshold.

* * * * *